United States Patent [19]

Huston et al.

[11] 4,279,161

[45] Jul. 21, 1981

[54] GAUGE

[76] Inventors: Paul O. Huston, 31 Lenape Dr., Montville, N.J. 07045; Alfred Munn, Three Wills Ave., Wayne, N.J. 07470

[21] Appl. No.: 64,915

[22] Filed: Aug. 8, 1979

[51] Int. Cl.³ .............................................. G01L 7/04
[52] U.S. Cl. ...................................... 73/743; 73/4 R
[58] Field of Search ................ 73/743, 742, 741, 740, 73/738, 732, 736, 368.6, 4 R

[56] References Cited

U.S. PATENT DOCUMENTS

| 3,213,688 | 10/1965 | Huston | 73/743 |
| 3,730,000 | 5/1973 | Waite | 73/743 |
| 3,803,918 | 4/1974 | Blough, Jr. | 73/743 |
| 3,810,390 | 5/1974 | Neugebauer | 73/743 |
| 3,952,598 | 4/1976 | Ferguson et al. | 73/743 |

Primary Examiner—Donald O. Woodiel
Attorney, Agent, or Firm—Darby & Darby

[57] ABSTRACT

A pressure gauge is disclosed which is generally suitable for use in connection with a fire extinguisher. The pressure responsive element is rotatably secured in position in the casing by an adjustable sleeve. The zero reference dial mark is provided on the casing, while remaining dial indicia may be on the viewing crystal. Both "off-pressure" and "on-pressure" alignment of the pointer and dial markings are enabled prior to sealing of the crystal to the casing. The seal between the crystal and the casing is ultrasonically formed and contains a weakened segment to enable release of excessive pressure within the casing.

13 Claims, 3 Drawing Figures

GAUGE

BACKGROUND OF THE INVENTION

The invention relates to gauges for indicating fluid pressure, and in particular to Bourdon tube type pressure gauges for use in connection with continuous monitoring of the pressure within fire extinguishers and the like.

Bourdon tubes are commonly used as the principal pressure sensitive unit in a variety of pressure gauges commercially available. The Bourdon tube has an angularly displaceable free end and pointer, the extent of displacement being proportional to the pressure applied. A calibrated dial plate is normally positioned on the casing beneath the pointer to translate tube displacement into values of pressure. Readout accuracy has been assisted heretofore by various calibration techniques limited to locating the pointer at only one position of the dial face.

However, it has not been possible heretofore to calibrate a Bourdon tube type gauge both by locating the pointer at the zero position and by aligning the dial indicia with the deflected position of the pointer resulting from the application of a pressure of selected value prior to completion of the gauge assembly. Accordingly, assembled gauges subjected to readout accuracy testing after assembly were often unable to pass quality control because of the normal variations in tolerance levels and consequent inconsistent "on-pressure" readings for the Bourdon tubes being utilized in the prior type of gauge construction. The Bourdon tube deflection, for various reasons does not always predictably correlate to fixed dial plate indicia of the gauge and many prior gauges have therefore been too often inaccurate. This has caused an unacceptably high post-assembly gauge rejection rate in the industry and contributes to increased costs and lower accuracy of the gauges.

Moreover, prior pressure tight gauges of the type described herein have often presented a hazard where the pressure responsive element or other pressure sensitive aspects of the gauges develop leaks or rupture to permit a pressure build-up within the gauge casing. Injury has occurred where the viewing crystal or lens blows out or fractures as a result of excessive pressure within the casing.

Furthermore, prior pressure gauges of the present type have required a plurality of pressure seals and other components to preserve the pressure tight assembly and to ensure adequate support for the pressure responsive element.

SUMMARY OF THE INVENTION

These and other disadvantages of the prior types of pressure gauge are obviated by the present invention in which a calibration adjustment may be made prior to assembly of the gauge to align the pressure responsive element to the zero position and to align the dial indicia to the deflected or actuated position of the element in the presence of a predetermined pressure being applied to the gauge. This may be accomplished, for example, by providing the zero marker on the casing and the remaining dial indicia on the viewing crystal. Under these conditions, the pressure responsive element (for example, a Bourdon tube) is first rotated to align its pointer with the zero reference on the casing. A selected pressure is then applied to the element prior to sealing of the crystal to the casing. The crystal is simply turned to align the proper indicium to the deflected pointer location, and is then hermetically sealed to the casing.

In accordance with the invention, the viewing crystal is sealed to the casing in such a way that the seal itself will fracture along a predetermined weakened section but will remain held in place by the remaining portions of the seal so as not to blow off of the casing. The seal of the crystal therefore releases along a predetermined location and to a predetermined extent to relieve safely any excessive pressure which develops within the gauge casing.

The present invention enables the manufacture of a more reliable, more accurate and less expensive gauge than is presently available.

BRIEF DESCRIPTION OF THE DRAWINGS

For a further understanding of the present invention, reference may be had to the accompanying drawings in which.

BRIEF DESCRIPTION OF THE PREFERRED EMBODIMENTS

Figure 3:
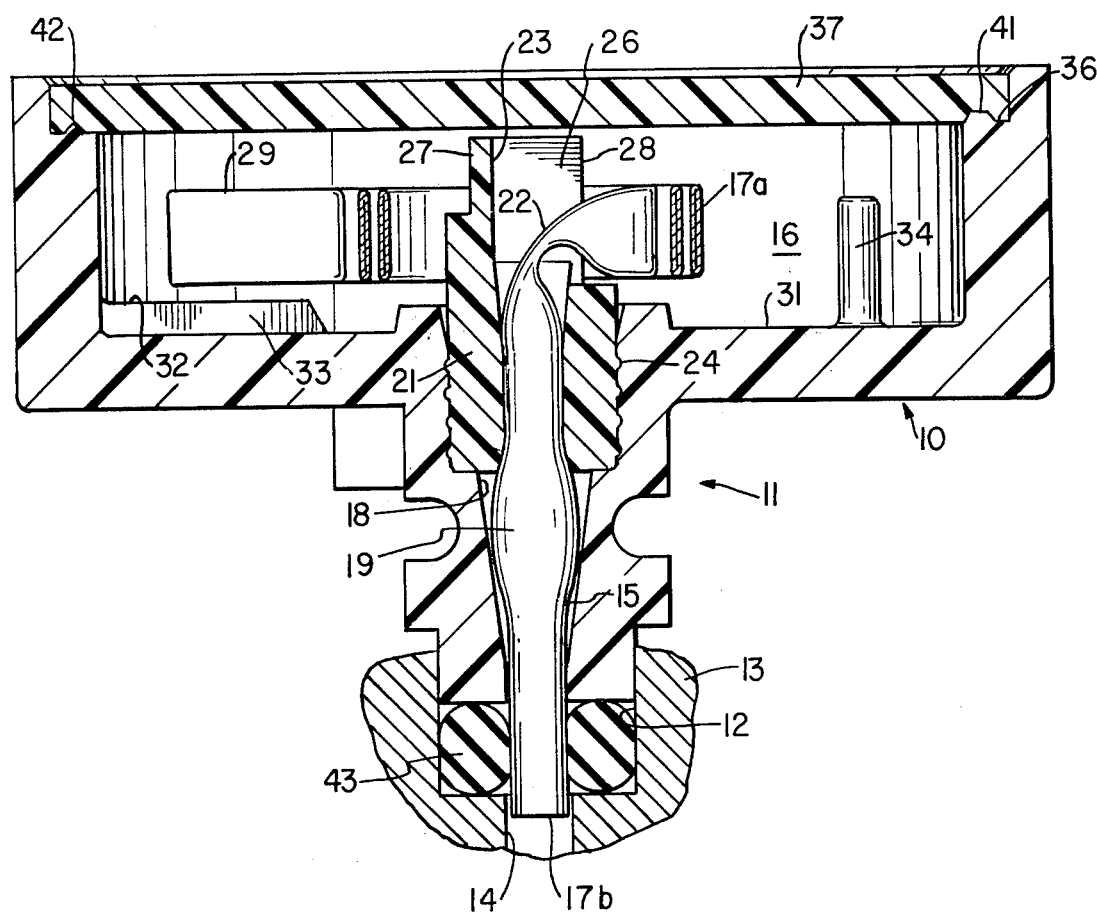
FIG. 3 is a view taken along the line 3—3 of FIG. 1.

Referring now to the drawings and in particular to FIG. 3, there is shown a gauge having a generally cup-shaped outer casing 10 which includes an outwardly or rearwardly projecting tubular stem 11 to engage a corresponding socket 12 formed within a pressurized container 13, for example, the casting or housing of a fire extinguisher. Fluid enters the gauge through passage 14 traversing the fire extinguisher housing. The stem 11 is provided with a longitudinal and preferably axially extending bore 15 which communicates with the interior 16 of the gauge defined by the inner boundaries or faces of the casing 10.

A multi-coiled Bourdon tube element 17, conventional in most respects, is rotatably mounted within and traverses the bore 15. The Bourden element is provided with deflection coils 17a situated within the interior 16 of the gauge casing 10. A substantially tubular input end section 17b traverses the bore 15 and protrudes longitudinally outwardly from the lower end of the stem 11. The Bourdon element is preferably of one-piece construction with end closure and no intermediate seal joints. The Bourdon element is suitably formed at the distal end of the deflection coils 17a to a Vee shape prior to sealing. Silver soldering of the flattened end of the Bourdon tube both seals the flattened tube and fills in the Vee area to form a pointer 29 for the gauge all in one operation. The pointer 29 extends substantially radially and is displaced or deflected angularly relative to the gauge casing when the Bourdon element is pressurized. The pointer end is preferably formed and covered or coated, e.g., with paint, to provide thickness and color contrast to its background, thereby to facilitate its observation.

The bore 15 is of non-uniform cross-section. A central portion 18 of the bore 15 has mutually diverging sidewalls in the direction of the casing to define a bore shaped like a frustum in cross-section. Stated differently, the sidewalls of the central portion 18 gradually converge with distance from the casing 10. The wide area of the bore 15 is intended to accommodate an enlarged diameter portion or bulge 19 in the diameter of the input tube 17*b*, the purpose for which will be explained in detail below.

In accordance with the present invention, a longitudinally bored or recessed retainer element or sleeve 21 surrounds a portion of the Bourdon input tube above the bulge 19 and extends upwardly to terminate at a horizontal plane above the usual 90° bends 22 formed in the Bourdon element, and above the plane defined by the upper edges of the Bourdon coils 17*a*. The central recess or bore 23 of the sleeve may be contoured to correspond to the shape of that portion of the Bourdon tube which it surrounds so as to establish a snug fit between the sleeve and the Bourdon element.

The bore 15 in stem 11 is enlarged at its inner end adjacent the central frusto-conical section 18 sufficiently to accommodate the sleeve, which is rotatably and preferably releasably mounted therein. The sleeve may be secured in place by a plurality of bead-like protuberances 24 formed in or otherwise provided on the outer periphery thereof to enable it to be snap fitted within the bore 15 through releasable engagement of the beads 24 with corresponding recesses or grooves formed in the bore sidewalls. While in place, as shown in FIG. 3, the sleeve 21 secures the Bourdon element 17 in position and holds it against inadvertent axial displacement in either direction along the stem. This occurs because the bulged tube portion 19 is effectively trapped between the lower end of the sleeve and the converging sidewalls of the conical bore section 18 so that the Bourdon tube will not move downwardly from the position shown in FIG. 3. Moreover, the sleeve is provided with a radial slot 26 which communicates with the central bore 23 and embraces a radially outwardly extending section of the Bourdon element which blends into the coils 17*a* after its 90° bend 22. Accordingly, the sleeve 21 is traversed both radially and longitudinally by the Bourdon element 17. The sleeve and element are effectively locked together for mutual rotation around the longitudinal axis of the stem 11. Thus while the sleeve retains the Bourdon element against longitudinal displacement, there is substantial freedom of rotational or angular displacement for both the sleeve and the Bourdon coils 17*a*. It should be noted that while the sleeve and casing 10 may be constructed of any suitable material, it is preferable for these to have substantially identical thermal properties.

Figure 2:
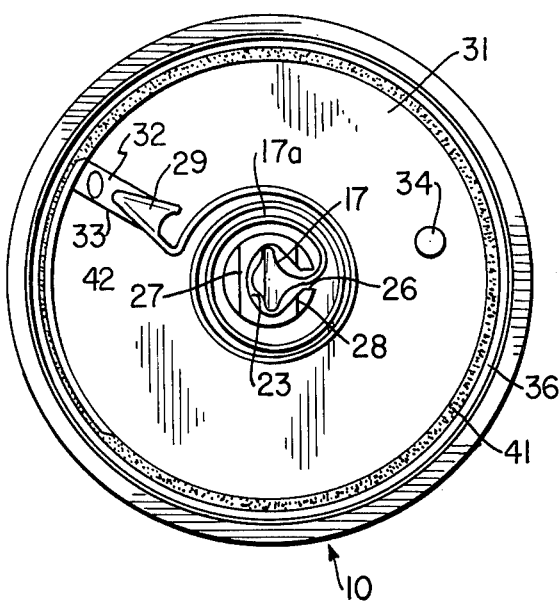
FIG. 2 is a top view similar to FIG. 1 but with the viewing crystal or lens removed.

With reference to FIG. 2, the upper end of the sleeve 21 may be provided with a pair of opposed and parallel adjusting flats 27 and 28. These flats provide gripping surfaces for any suitable tool with which to turn the sleeve and the Bourdon element while calibrating the gauge to conform to the zero reference dial indicator as described below. It is understood of course that other techniques might be used for turning the sleeve and Bourdon element without departing from the scope of the invention. For example, the upper end of the sleeve might be slotted or recessed in such a way as to permit the use of a screw driver.

The casing 10 defines a generally annular flat inside face or floor 31 which is provided with a fixed zero reference mark 32 for the pointer 29. The zero reference mark may take any suitable configuration without departing from the scope of this invention. In the present embodiment, the reference mark 32 consists of an elongated radially extending raised section 33. The top surface of the section 33 may be covered or color coated for easy viewing. In accordance with the invention, the fixed casing floor 31 contains none of the other pressure dial calibrations or gradations.

An upwardly protruding stop post 34 is provided on the floor 31 a fixed angular distance from the zero reference mark 32. It rises to a point adequate to intercept the path of angular deflection or displacement of the pointer 29 and acts as a stop to engage the pointer in the event that a predetermined maximum pressure within the Bourdon tube is exceeded.

Figure 1:
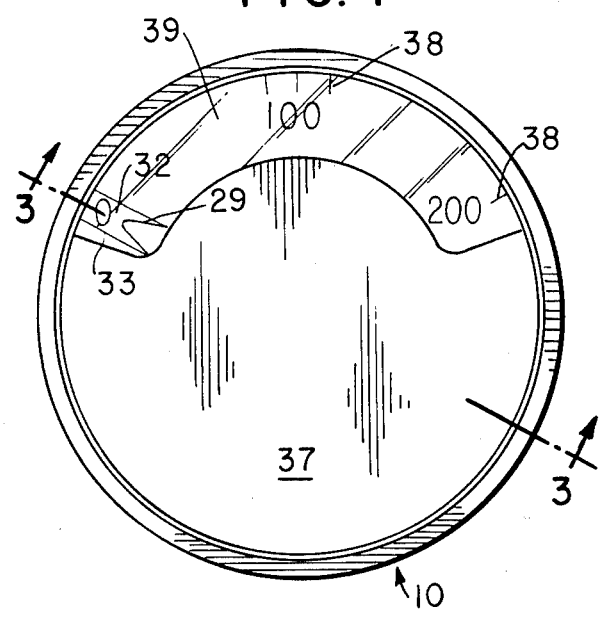
FIG. 1 is a top view of a gauge in accordance with the present invention and showing the viewing crystal or lens in place on the gauge.

The outer periphery of the casing 10 is preferably flanged to provide an annular shoulder step 36 with which a transparent viewing crystal or lens 37 may be sealably interfit. The lens is preferably plastic and may be provided with appropriate dial face indicia, gradations or markings 38 representative of pressure within the Bourdon tube 17. Back printing or other suitable techniques may be used for applying the markings 38 to the lens. As indicated in FIG. 1, the lens may be substantially opaque, except for a transparent viewing window 39 through which the position of the pointer 29 relative to the dial markings may be observed.

Calibration of the present gauge is simple and accurate. After sub-assembly of the various parts of the gauge, excluding the lens 37, the pointer 29 is aligned with the zero reference mark 32 on the casing floor 31 by rotating the sleeve 21. This subassembly is then connected with a source of predetermined pressure (corresponding to that in a fire extinguisher, for example, on which the gauge would eventually be permanently mounted) to pressurize the Bourdon element 17. The pointer is thereby deflected or displaced to some actuated position in the direction of the stop post 34. The lens 37 is then fit to the casing 10 and rotated to a position where an appropriate one of the lens indicia 38 is aligned with the actuated pointer 29. Upon achieving such "on-pressure" alignment, the lens may be sealed to the casing. As described below, ultrasonic welding may be utilized to effect the seal. Since adjustments may be made at both the "off-pressure" or zero reference point and the "on-pressure" or actuated reference point on the crystal or lens, the complete performance characteristics of each Bourdon tube utilized in the gauge may be compensated for, and substantially wider tolerances may be permitted in the manufacture and selection of the Bourdon elements. This results in a reduction of end product rejection, enables significant cost savings and improves overall accuracy of this type of gauge.

In the alternative, the "on-pressure" indicia for the dial face gradations may be provided on a suitable annular disc (not shown) which is rotatably mounted adjacent to and overlying the casing floor 31. This indicia bearing disc may then be rotated, after pressure is applied to the Bourdon tube and before an ordinary viewing crystal is secured in place, to align a selected indicium to the actuated pointer position. Alternatively, the indicia may be marked individually in each gauge at the time of calibration. Suitable means may then be implemented for securing the disc in place and the viewing crystal may then be sealed to the casing.

Referring now to FIGS. 2 and 3, the lens 37 is preferably positioned below the uppermost portion of the rim of the casing 10, thereby to protect the lens face from damage as may result from normal handling and/or machine assembly to a mating component. In accordance with one aspect of the invention, the lens 37 is sealed to the casing 10 in such a way as to avoid the risk that the lens would be fractured or otherwise blown away from the casing upon excessive pressure build-up within the pressure tight gauge casing (such as might result from a leak in the Bourdon element). The technique involves ultrasonic welding in such a way that the peripheral sonically welded joint is weaker along a predetermined segment than along other parts of the weld. Upon careful control over the strength of the weakened segment of the seal, the joint will fracture to relieve pressure within the casing before the lens itself fractures or releases entirely, and will rupture only along the predetermined weakened area. The lens will remain in place because of the other stronger portions of the weld joint and will not shatter since excessive pressure is relieved through the seal fracture.

The technique may be implemented by providing a plastic welding ring or casing element 41 to contact both the undersurface of the lens near its periphery and the annular casing shoulder 36. The casing element 41 may be an integral part of the casing 10 thereby requiring sealing of one surface interface only. In this case both the lens and casing are of compatible materials. The lens may be slotted peripherally to receive the element as desired. In accordance with the invention, a predetermined segment 42 of the element 41 is substantially thinner by a calculated amount than the remaining body of the element. The element acts as a "selective energy director" and is melted upon the application of ultrasonic frequencies and fuses both to the underside of the lens and to the surface of the casing shoulder to secure the lens in place on the casing. Control over the thickness and length of the element segment 42 affords precise control over the strength of the resulting weld bond along that segment.

The calibrated and assembled gauge may then be inserted into the fire extinguisher 13 which contains the pressurized fluid to be monitored. Since the lower or tubular input end 17b of the Bourdon element 17 extends outwardly away from the stem 11, it may be sealed directly to the valve body by means of an O-ring seal 43. The O-ring 43 seals both the Bourdon tube and the stem 11 thereby eliminating the need for a secondary internal seal or braze joint otherwise required for most gauges heretofore.

Various changes and modifications will occur to those skilled in the art. Accordingly, the scope of the present invention is not be be limited except by the following claims.

What is claimed is:

1. A gauge for indicating fluid pressure having a casing with an outwardly protruding mounting stem and a viewing crystal, the gauge comprising:
    a Bourdon tube pressure responsive element mounted in the casing and having a pointer displaceable along a predetermined path in response to the pressure of the fluid, a substantially tubular portion of said Bourdon tube axially traversing the mounting stem through a central bore therein; and
    means rotatably securing said tube to the casing for locating said pointer at a first position before assumbly of the viewing crystal which retains said Bourdon tube against translational movement along the axis of the stem, said securing means comprising a sleeve surrounding said tubular portion within the stem and having a radial slot to embrace a substantially radially protruding section of said Bourdon tube thereby to exert both axial and rotational control over the Bourdon tube.

2. The gauge of claim 1 in which the tubular portion of said Bourdon tube comprises an expanded diameter section.

3. The gauge of claim 2 in which said sleeve surrounds said Bourdon tube inwardly of said expanded diameter section to inhibit inward axial movement thereof.

4. The gauge of claim 3 in which a section of said stem bore is provided with mutually diverging sidewalls in the direction of the casing, whereby said section defines a bore in the shape of an inverted frustum.

5. The gauge of claim 4 in which only the large diameter of said frustum-shaped bore is sufficient to encompass the expanded diameter section of said Bourdon tube, thereby to inhibit outward axial movement thereof.

6. The gauge of claim 5 in which said sleeve extends above said Bourdon tube and comprises a pair of opposed flats by which to grip the sleeve thereby to turn said Bourdon tube to locate the pointer.

7. The gauge of claim 6 in which said sleeve is releasably secured to the casing.

8. A gauge for indicating fluid pressure having a casing with an outwardly protruding mounting stem and a viewing crystal hermetically sealed to the casing, the seal having a weakened segment to fracture to relieve pressure within the casing upon a predetermined pressure being achieved therein, the gauge comprising:
    a Bourdon tube pressure responsive element mounted in the casing and having a pointer displaceable along a predetermined path in response to the pressure of the fluid; and
    means rotatably securing said tube to the casing for locating said pointer at a first position before assembly of the viewing crystal.

9. The gauge of claim 8 in which said predetermined pressure is substantially 50 psig.

10. A method of calibrating a fluid pressure gauge having a casing, a pressure responsive element mounted in said casing having an indicating pointer displaceable along a predetermined path to register pressure on the gauge, a fixed zero pressure reference dial indicator, means rotatably securing said pressure responsive element to the casing, and a dial face for bearing indicia representative of selected pressure levels, comprising steps of:
    adjusting the pointer to the zero reference indicator by rotating said means securing said pressure responsive element;
    pressurizing the gauge to a predetermined pressure level; and
    aligning dial face indicia with the pointer at its actuated position prior to sealing of the dial face to said casing.

11. The method of claim 10 in which the dial face is carried by a viewing crystal through which the pointer is observable and the crystal is rotated to align said one indicia with the actuated pointer.

12. The method of claim 11 comprising the additional step of sealing said crystal to the gauge after its alignment with the actuated pointer.

13. The method of claim 10 in which the pointer is formed on the free end of a Bourdon tube and the tube is rotated within the gauge to position the pointer at the zero reference indicator.

* * * * *